United States Patent
Krog et al.

(10) Patent No.: US 8,026,121 B2
(45) Date of Patent: Sep. 27, 2011

(54) METHOD FOR PRODUCING ELECTRONIC COMPONENTS AND PRESSURE SENSOR

(75) Inventors: Jens Peter Krog, Ulstrup (DK); Gert Friis Eriksen, Greve (DK); Karsten Dyrbye, Silkeborg (DK)

(73) Assignee: Grundfos Management a/s, Bjerringbro (DK)

( * ) Notice: Subject to any disclaimer, the term of this patent is extended or adjusted under 35 U.S.C. 154(b) by 45 days.

(21) Appl. No.: 12/279,370

(22) PCT Filed: Jan. 30, 2007

(86) PCT No.: PCT/EP2007/000780
§ 371 (c)(1),
(2), (4) Date: Aug. 14, 2008

(87) PCT Pub. No.: WO2007/093279
PCT Pub. Date: Aug. 23, 2007

(65) Prior Publication Data
US 2009/0004766 A1    Jan. 1, 2009

(30) Foreign Application Priority Data
Feb. 15, 2006  (EP) ..................................... 06002983

(51) Int. Cl.
*H01L 21/00* (2006.01)
(52) U.S. Cl. .......... 438/53; 438/113; 438/462; 257/419; 257/620; 257/E21.599

(58) Field of Classification Search ........................ None
See application file for complete search history.

(56) References Cited

U.S. PATENT DOCUMENTS

| | | | | |
|---|---|---|---|---|
| 4,115,120 | A | * | 9/1978 | Dyer et al. ..................... 438/670 |
| 5,521,125 | A | * | 5/1996 | Ormond et al. ................ 438/465 |
| 5,629,538 | A | | 5/1997 | Lipphardt et al. |
| 5,904,548 | A | * | 5/1999 | Orcutt ........................... 438/460 |
| 6,030,709 | A | * | 2/2000 | Jensen et al. .................. 428/446 |
| 6,303,977 | B1 | * | 10/2001 | Schroen et al. ............... 257/635 |
| 6,747,329 | B2 | * | 6/2004 | Yoshihara et al. ............ 257/419 |
| 7,713,771 | B2 | * | 5/2010 | Eriksen et al. .................. 438/53 |

FOREIGN PATENT DOCUMENTS
DE    4415984 A1    11/1995
DE    29724662 U1   7/2002

* cited by examiner

*Primary Examiner* — Thanh V Pham
*Assistant Examiner* — Andres Munoz
(74) *Attorney, Agent, or Firm* — Panitch Schwarze Belisario & Nadel LLP

(57) ABSTRACT

A method produces electronic components in particular electronic sensors for pressure and differential pressure measurement. Firstly, the semiconductor structure of the electronic components is produced on a wafer. An insulating oxide layer is then applied. A protective metal layer is subsequently applied. The metal layer is applied in sections only in those regions of the wafer in which no splitting, for example by mechanical separation, occurs later. The electronic components thus formed in the wafer are then divided up into individual elements.

4 Claims, 3 Drawing Sheets

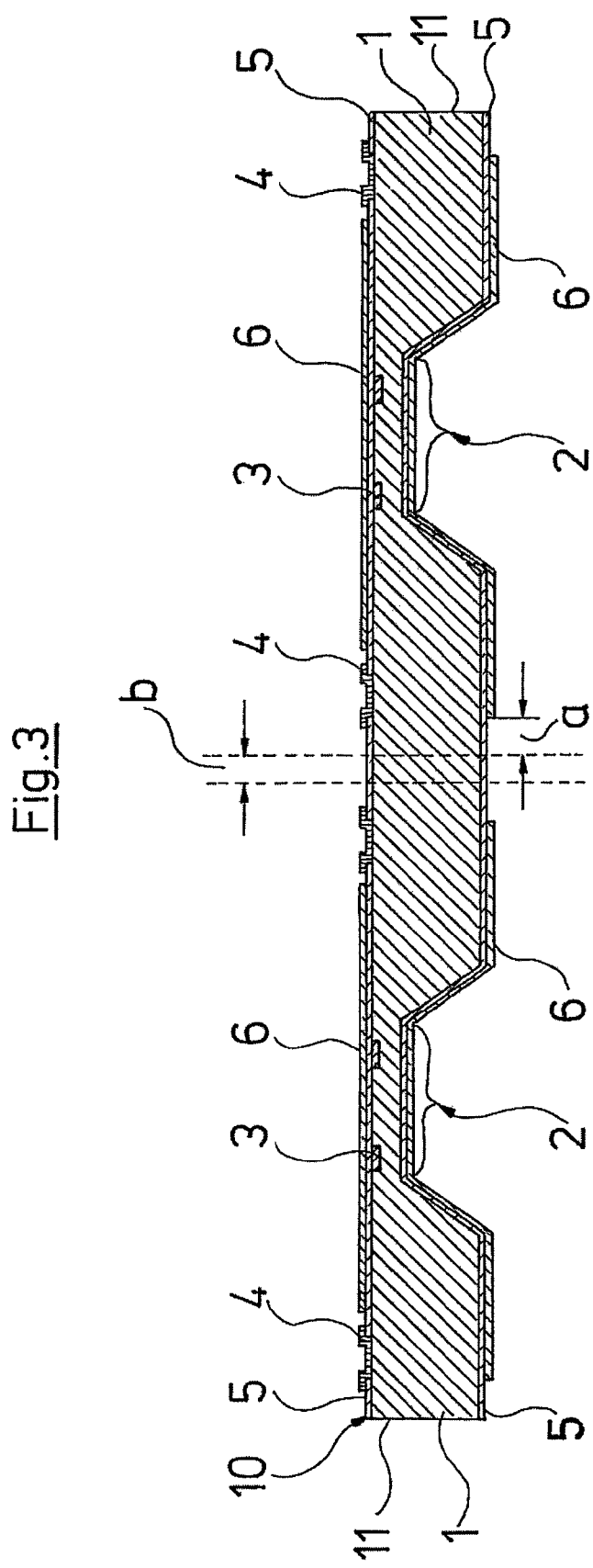

METHOD FOR PRODUCING ELECTRONIC COMPONENTS AND PRESSURE SENSOR

CROSS-REFERENCE TO RELATED APPLICATION

This application is a Section 371 of International Application No. PCT/ep2007/000780, filed Jan. 30, 2007, which was published in the German language on Aug. 23, 2007, under International Publication No. WO 2007/093279 A3, and the disclosure of which is incorporated herein by reference.

FIELD OF THE INVENTION

The invention relates to a method for producing electronic components, in particular for producing electronic sensors for pressure measurement and/or differential pressure measurement, according to the features specified in claim 1, as well as to such an electronic components, according to the features specified in the preamble of claim 5.

BACKGROUND OF THE INVENTION

Electronic components, in particular for the application as pressure sensors or differential pressure sensors, are for example known from DE 297 24 622 U1. They consist of a semiconductor substrate which is designed in a thinned manner in the region which is to form the later membrane region. In this region, the actual measurement elements are also designed in the form of resistors, which are typically connected into a measurement bridge and with a later application, change their resistance characteristics on account of the membrane expansion, which in turn may be used as a measure of the prevailing pressure, for electronic evaluation. The silicon substrate, as well as the measurement elements which are formed therein, on the upper side and lower side of the substrate, are in each case provided with an insulating layer, typically an oxide layer, which in turn is coated with a corrosion-resistant metal layer, typically a chrome-tantalum layer. With known components, this metal layer extends to both sides up to the edge, and is only interrupted in the region of the connection contacts.

Such electronic components are not manufactured individually, but typically in the form of wafers, i.e. a multitude of electronic components are formed lying next to one another in the silicon substrate or on the silicon substrate, whereupon the insulating layer is deposited and finally the protecting metal layer is deposited. The multitude of electronic components which is thus formed is then mechanically separated into individual components. This method has been applied for some time in semiconductor technology, and has proven its worth.

However, it is particularly with the production of electronic sensors for pressure measurement and/or differential pressure measurement, which need to be provided with a corrosion resistant metal layer, that the problem arises, whereby on dividing up the wafer, thus on separating the individual components, the metal layer at the edge is not always cut away in a smooth manner, but rubbing effects occur and metal particles get into the region of the end-sides between the connection contacts and the metal layer. The insulating layer may also be damaged in the edge region on dividing up, by which means the metal layer comes to bear directly on the substrate and creepage currents may occur. The electronic characteristics of the components formed in this manner may be compromised by way of this. This at least leads to the fact that the electronic components which are formed in this manner have a comparatively large tolerance, which is disadvantageous.

SUMMARY OF THE INVENTION

Against this background, it is the object of the invention to design a method according to the known type, such that the previously mentioned disadvantages are reduced, and in particular the creepage currents which are possibly caused by way of this are avoided.

According to the invention, this object is achieved by a method with the features specified in claim 1. Advantageous designs of the method according to the invention are specified in the dependent claims.

An electronic component which is produced with the method according to the invention, is characterised by the features of claim 5, and advantageous designs of this component are characterised by the features of the dependent claims 6 and 7. Further advantageous designs of the invention are specified in the subsequent description as well as the drawing.

The method according to the invention envisages the semiconductor structures of the electronic components being produced firstly on a wafer, whereupon at least one insulating layer, e.g. an oxide layer as well as subsequently at least one protective metal layer is deposited. According to the invention, the metal layer however is deposited in sections and only in the regions of the wafer, in which a division of the wafer is no longer effected afterwards. Instead of depositing the metal layer in sections, this may alternatively be deposited onto the wafer over the whole surface, for example by way of vapour deposition, wherein afterwards the metal layer is removed before the division, at least in the regions in which the division of the wafer is later effected. With both methods therefore, one always ensures that no metal layer is present in the regions of the later separating gaps, before the division of the wafer. Thereafter, the electronic components which are thus formed are released from the composite by way of cutting the wafer.

The basic concept of the present invention is therefore not to provide the regions in which the wafer is divided after the effected manufacturing process for forming the individual electronic components, with a metal layer, or to remove the metal layer there in a targeted manner, so that one also does not need to sever a metal layer with the later severing of the wafer. This has the advantage that the metal layer does not need to be divided and thus also the initially outlined disadvantageous effects which lead to a comparatively large tolerance of the electric characteristics of the thus formed electronic components, do not occur. The method according to the invention, therefore, by way of a targeted deposition of the metal layer only in those regions in which a division of the wafer is not subsequently effected, permits a significant reduction in the tolerance of the electrical characteristics of the thus formed components and an increase in the quality of the components, without rendering the manufacturing process significantly more expensive or complicated, since the metal layer in any case does not need to be provided in an extensive manner, but always only in sections, since even as was previously the case, a recess had to be provided in any case for example in the region of the electrical contacts.

It is favorable with regard to manufacturing technology to provide the wafer with a metal layer over the whole surface by way of vapour deposition and then to remove this in sections by way of a chemical or electrochemical process, advantageously by way of etching. The sectioned removal of the metal layer may alternatively also be effected by way of suitable thermal action, for example by way of laser radiation.

However, it may be advantageous to vapour deposit the metal layer in sections from the very beginning, and then, advantageously, the regions in which the later division of the wafer is effected, are covered by way of masking before the deposition of the metal layer. The masking ensures that the metal layer does not stick, so that no metal layer is deposited in the masked regions.

If the metal layer ends at a sufficient distance to the later separating gap or to the end-side which is then formed on the peripheral side there, then basically one may make do without a further processing/machining of these narrow end-sides which are formed by the separation. If however, for reasons of space, the remaining distance of the metal layer to the separating gap is comparatively low, then it may be particularly advantageous if the end-sides which are formed by the division, are sealed after the division of the wafer, for example by way of a curing sealing which is liquid on deposition and which has an electrically insulating effect. This sealing not only protects the narrow end-sides of the respective component which are formed on separation, but also ensures that any damage in particular microscopic break-offs in the edge region of the insulating layer are filled, so that no significant creepage currents may form even in this region.

The electronic component according to the invention which is formed in this manner, is characterised in that its protective metal layer which exists at least to one side, ends at a distance to the closed peripheral edge on all sides. It is to be understood that the distance to the closest peripheral edge must on the one hand be selected so small that at all events, it is ensured that the region to be protected, which with a differential pressure sensor or pressure sensor, is typically the membrane region as well as the clamping region surrounding this, is protected by the metal layer, but on the other hand is selected so large, that it is ensured that the later separating procedure is effected outside the metal layer.

With a differential pressure sensor with which the membrane, which is formed by thinning the silicon substrate, is impinged with pressure on both sides, a protective layer is provided also on both sides, which not only encompasses the membrane itself but also the directly adjacent region, advantageously beyond the clamping location, so that the component is reliably protected from external influences. The clamping location in the previously mentioned context is not necessarily the location at which the component is mechanically held, but the location at which the component is sealed with respect to the medium whose pressure or differential pressure is to be measured.

It is particularly advantageous if the electronic component according to the invention is provided with a sealing at its end-sides, i.e. at the sides which are formed by way of separation from the wafer. Such a sealing is usefully designed such that it may be deposited in fluid form, and after curing/drying forms an electrical insulating layer which also protects the substrate from external influences as the case may be.

The invention is not limited to a method for producing pressure sensors or differential pressure sensors, but may also be applied to other electronic components, with which the initially described disadvantageous effect occurs when the wafer is separated into individual components. It is to be understood that this method may also be applied to those layers, which as the case may be, do not consist of metal, and with which a similar effect arises with the later division.

DESCRIPTION OF THE DRAWINGS

The invention is hereinafter described in more detail by way of an embodiment example represented in the drawing. There are shown in.

DETAILED DESCRIPTION

Figure 1:
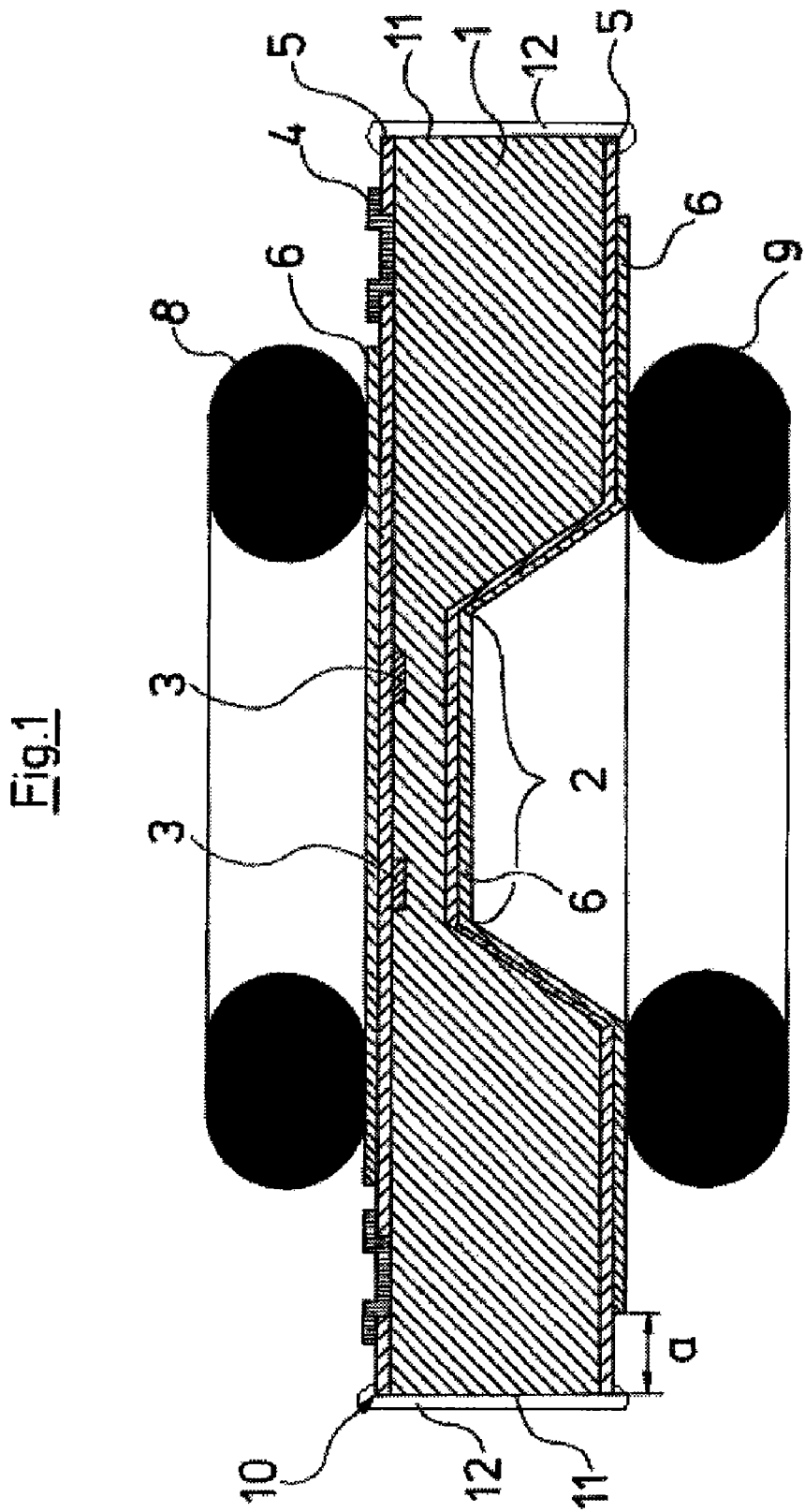
FIG. 1 an electronic component in the form of a differential pressure sensor with clamping, in a greatly simplified schematic sectioned representation, FIG. 2 a plan view of an electronic component according to FIG. 1, and FIG. 3 a section though a section of a wafer in the region of two electronic components lying next to one another.

With regard to the represented electronic component, it is the case of a differential pressure sensor which is constructed of a silicon substrate 1, which is thinned out where the actual membrane of the later sensor arises. This membrane region is characterised at 2. Electronic components in the form of resistors 3 are formed in this membrane region 2 on the upper side according to the representation according to FIG. 1, in the silicon substrate 1, and these resistors are connected in the known manner into a measurement bridge (not shown in detail) whose electrical connections are led out on the upper side of the silicon substrate 1 in the form of contacts 4. These contacts 4 consist of aluminum just as the strip conductors (not shown) to the resistors 3, which are formed in the same manner, as well as the further electronic parts of the components, which are not described in detail here.

The silicon substrate 1 with the resistors 3 formed therein, components, as well as the strip conductors located therein, is covered on both sides in each case by an insulating oxide layer, which is only broken by the contacts 4.

The oxide layer 5 in turn is covered by a corrosion-resistant metal layer 6 in the form of a metal layer 6 formed of a chromium-tantalum alloy. The metal layer 6 is not only provided in the membrane region 2, but also extends laterally beyond the clamping region 7 and ends at a distance to the closest peripheral edge 10 of the electronic component, which is formed by the silicon substrate 1 with its formations. The clamping region 7 is represented in FIG. 2 by an interrupted line. It is to be deduced from the representation according to FIG. 1, in which two O-rings 8 and 9 are represented, which in the later position of installation form the clamping for the sealed integration of the component into a housing. These O-rings 8, 9 then seal the actual membrane region 2 protected on both sides by the metal layer 6, with respect to the edge regions. These O-rings 8 and 9 typically lie within a sensor housing, via which the fluid impingement is effected to both sides of the membrane 2.

Figure 2:
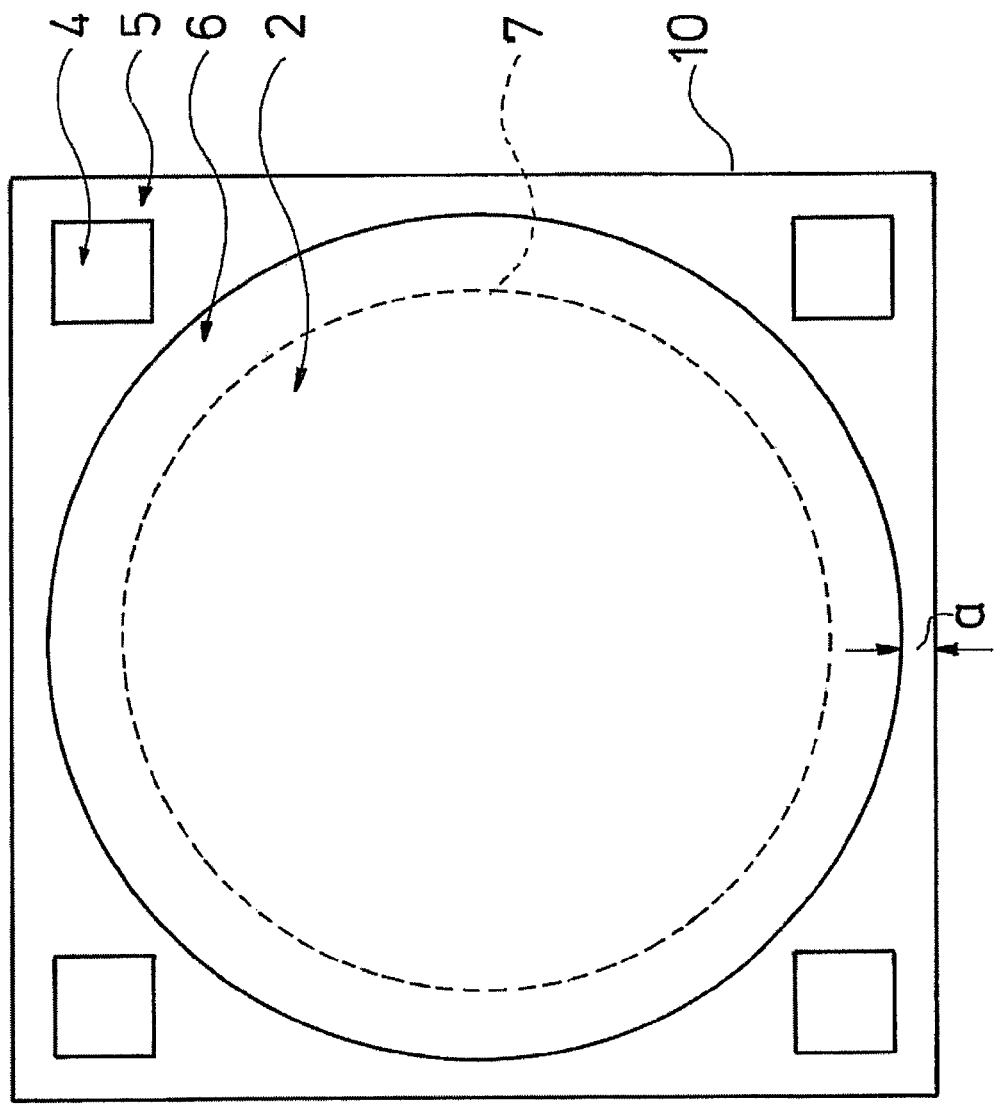

The component represented by way of FIGS. 1 and 2 comprises a silicon substrate of a square shape. The contacts 4 for the electrical connection of the component lie in the corner regions. The metal layer 6, as FIG. 2 shows, is designed in a circular manner and in a manner such that the contacts 4 lie outside the circular area, wherein the diameter of the circle is significantly smaller than the side length of the component, so that a minimum distance a to the closest outer edge 10 of the substance 1 is always formed. The metal layer 6 on the lower side may in contrast be designed in a square manner according to the substrate shape, wherein there the edge length of the square of the metal layer 6 usefully corresponds to the diameter of the circle of the metal layer 6 on the other side, in order here to ensure a minimum distance a to the closest peripheral edge 10.

The previously described design of the metal layers 6 at a distance to the peripheral edge 10 has the advantage that no particular free locations need to be created for the contacts 4, but on the other hand it is always ensured that within a wafer, (two components within a wafer before the division are represented in FIG. 3), the region b in which the severing of the wafer into individual components is effected, is not covered by the metal layer 6.

Two components, as are arranged in an adjacent manner within the wafer, are represented by way of example in FIG. 3. On severing the wafer after completion of the actual manufacturing process of the components, the region which is characterised there at b is separated out, by which means the composite of the components is separated. The initially describe rubbing effects and contamination by metal parts no longer occurs, since no metal layer is present in this region. As FIG. 3 clearly shows, the metal layers 6 end at a distance a to this region b, so that a certain tolerance range is formed for the cutting gap, which always ensures that the metal layer 6 remains untouched with the cutting procedure.

The end-sides 11 formed by the cutting procedure are provided with a sealing 12, which electrically insulates and protects the substrate, also in this region. Since parts of the insulating oxide layer 5 may be broken out near the peripheral edge 10 by way of the separating procedure (be it mechanical or by laser cutting), the sealing 12 is designed such that it connects to the insulating oxide layer 5, i.e. goes beyond the peripheral edge 10 and replaces these parts of the insulating layer 5 which are broken out as the case may be.

LIST OF REFERENCE NUMERALS

1—silicon substrate
2—membrane region
3—resistors
4—contacts
5—insulating oxide layer
6—metal layer
7—clamping region
8—O-ring above
9—O-ring below
10—peripheral edge
11—end-sides
a minimum distance
b region of the separating location of the wafer

The invention claimed is:

1. A method for producing electronic sensors for pressure measurement and/or differential pressure measurement comprising:
   producing, on a wafer, semiconductor structures of the electronic sensors;
   depositing at least one insulating layer on the wafer, including on separating location regions thereof;
   subsequently depositing at least one protective metal layer, wherein the metal layer is either
     (i) deposited only in regions outside of the separating location regions of the wafer, leaving the insulating layer in the separating location regions exposed, or
     (ii) deposited and portions thereof are subsequently removed from the separating location regions of the wafer, leaving the insulating layer in the separating location regions exposed; and
   dividing the wafer at the separating location regions into the electronic sensors, wherein for each electronic sensor the metal layer extends over a membrane region and a surrounding clamping region to at least a predetermined minimum distance from a closest peripheral edge of the electronic sensor formed by division of the wafer.

2. A method according to claim 1, wherein the metal layer is deposited and portions thereof are subsequently removed from the separating location regions of the wafer, wherein removal of the portions of the metal layer from the separating location regions of the wafer is effected by one of etching or laser radiation.

3. A method according to claim 1, wherein the metal layer is deposited only in regions outside of separating location regions of the wafer, the method further comprising:
   masking the separating location regions of the wafer before the deposition of the metal layer.

4. A method according to claim 1, further comprising:
   after the division of the wafer, sealing end-sides of the electronic sensors formed by the division of the wafer.

* * * * *